United States Patent
Wang

(10) Patent No.: US 9,797,438 B1
(45) Date of Patent: Oct. 24, 2017

(54) FASTENING STRUCTURE OF RANGEFINDER WHEEL

(71) Applicant: Hung-Hui Wang, Taichung (TW)

(72) Inventor: Hung-Hui Wang, Taichung (TW)

(73) Assignee: Hung-Hui Wang, Taichung (TW)

( * ) Notice: Subject to any disclaimer, the term of this patent is extended or adjusted under 35 U.S.C. 154(b) by 0 days.

(21) Appl. No.: 15/260,339

(22) Filed: Sep. 9, 2016

(51) Int. Cl.
*F16C 11/10* (2006.01)
*G01B 3/12* (2006.01)

(52) U.S. Cl.
CPC ............... *F16C 11/10* (2013.01); *G01B 3/12* (2013.01)

(58) Field of Classification Search
CPC ..... Y10T 403/32254; Y10T 403/32319; Y10T 403/32327; Y10T 403/32409; Y10T 403/59; Y10T 403/591; Y10T 403/599; Y10T 403/60; Y10T 403/602; Y10T 403/608; G01B 3/12
See application file for complete search history.

(56) References Cited

U.S. PATENT DOCUMENTS

| | | | | |
|---|---|---|---|---|
| 6,579,029 B1* | 6/2003 | Sevde | ................. | H05K 7/1409 403/321 |
| 7,555,846 B1* | 7/2009 | Wang | ....................... | G01B 3/12 33/772 |
| 8,522,448 B2* | 9/2013 | Lai | .......................... | G01B 3/12 33/772 |
| 8,572,861 B2* | 11/2013 | Lai | .......................... | G01B 3/12 33/779 |
| 2006/0180190 A1* | 8/2006 | Ju | .......................... | E04H 15/48 135/120.3 |
| 2013/0243520 A1* | 9/2013 | Perosino | .................. | F16B 1/00 403/83 |

* cited by examiner

*Primary Examiner* — Jonathan Masinick

(57) ABSTRACT

A fastening structure of a rangefinder wheel includes a first unit and a second unit. The first unit includes a first base which has a first passage defined axially therethrough for receiving a first tube therein. A lever is pivotably connected to the first base and has an engaging hole. A first spring and a second spring are biased between the first base and the lever. The second unit is pivotably connected to the first base and has a second base which has a second passage defined axially therethrough for receiving a second tube therein. An engaging member is connected to the second base and has a protrusion which is engaged with the engaging hole of the lever. The lever compresses the first spring to move a distance transversely. The lever compresses the second spring to move a distance axially so as to separate the lever and the engaging member.

4 Claims, 8 Drawing Sheets

FASTENING STRUCTURE OF RANGEFINDER WHEEL

BACKGROUND OF THE INVENTION

1. Fields of the Invention

The present invention relates to a rangefinder wheel, and more particularly, to a fastening structure of rangefinder wheels.

2. Descriptions of Related Art

The conventional rangefinder wheels usually are more than one meter which is convenient for the users to use. However, the length of the conventional rangefinder wheels are not suitable for transportation and storage. Besides, the conventional rangefinder wheels involve too many parts which make the maintenance be more difficult.

The applicant develops the fastening structure of rangefinder wheels, and the fastening structure allows the users to easily assemble and dis-assemble the rangefinder wheel of the present invention.

SUMMARY OF THE INVENTION

The present invention relates to a fastening structure of a rangefinder wheel, and comprises a first unit and a second unit, wherein the first unit includes a first base which has a first passage defined axially therethrough for receiving a first tube therein. A lever is pivotably connected to the first base and has an engaging hole. A first spring and a second spring are biased between the first base and the lever. The second unit is pivotably connected to the first base and has a second base which has a second passage defined axially therethrough for receiving a second tube therein. An engaging member is connected to the second base and has a protrusion which is engaged with the engaging hole of the lever.

Preferably, the first unit has a first pin. The first base has two circular holes and the lever has an oval hole. The first pin extends through the two circular holes and the oval hole.

Preferably, the first base has multiple first pivotal holes, and the second base has multiple second pivotal holes. A second pin extends through the first and second pivotal holes.

Preferably, the engaging member includes a curved recess defined in the underside thereof. The lever includes a hooked end which is removably engaged with the curved recess.

Preferably, the first base has a first positioning point. The lever has a second positioning point. The first spring is connected between the first and second positioning points.

Preferably, the lever has a serrated surface for providing friction.

The primary object of the present invention is to provide a fastening structure of a rangefinder wheel, wherein the lever compresses the first spring to move a distance transversely, and the lever comprises the second spring to move a distance axially so as to separate the lever and the engaging member. The lever returns to its initial position by the recovery forces from the first and second springs.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
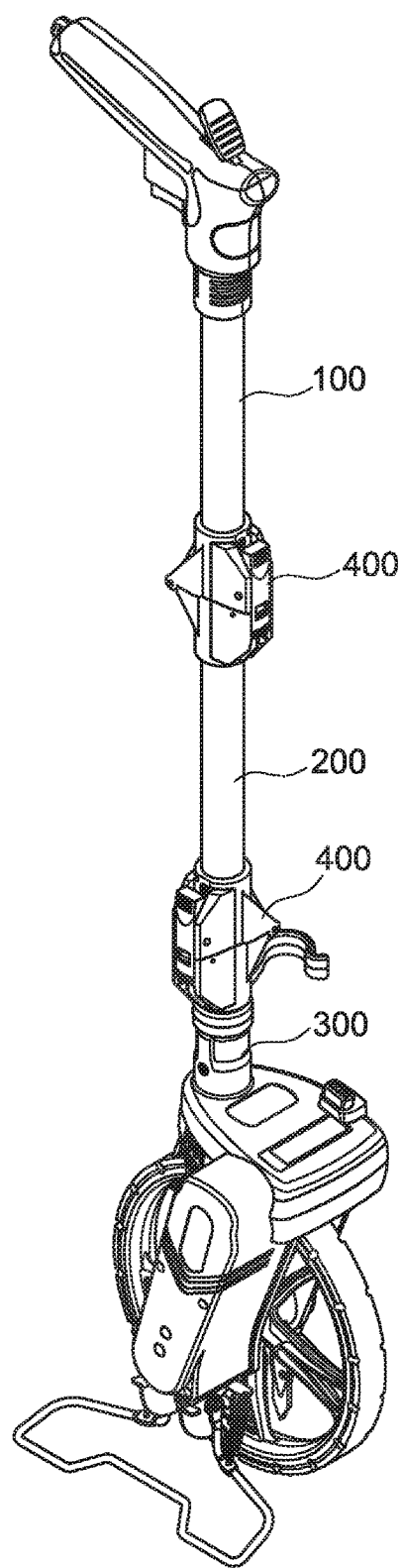
FIG. 1 is a perspective view to show the rangefinder wheel of the present invention.
Figure 2:
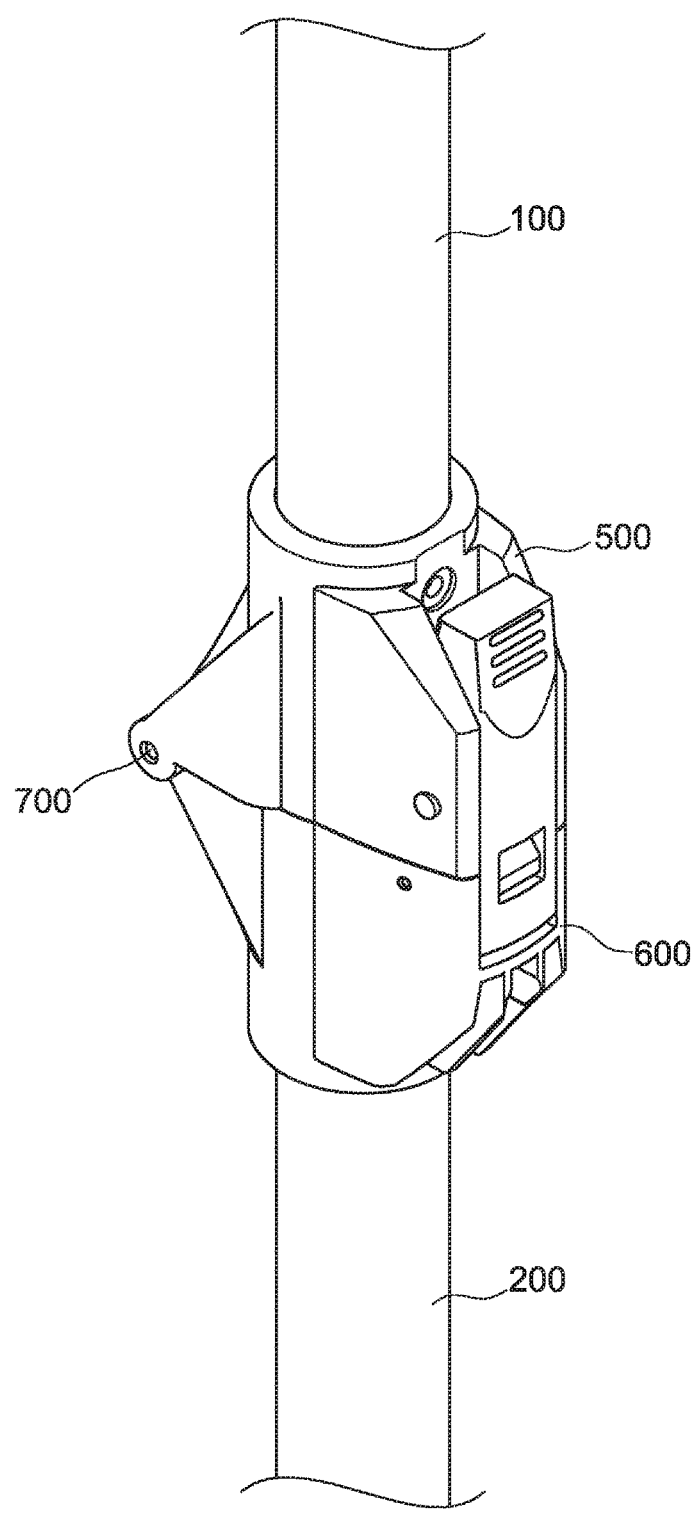
FIG. 2 is an enlarged view to show the fastening structure of the rangefinder wheel of the present invention.
Figure 3:
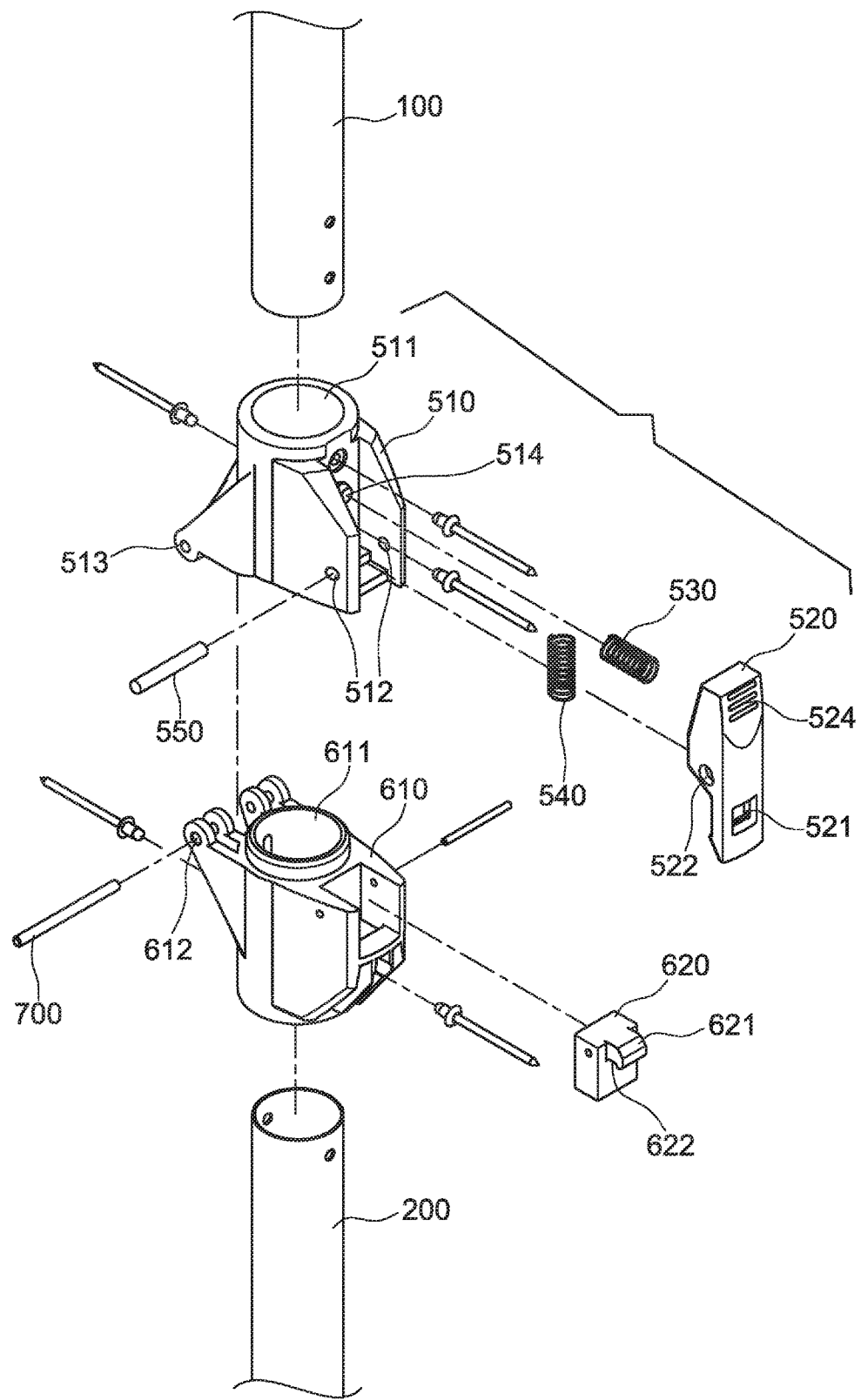
FIG. 3 is an exploded view to show the fastening structure of the rangefinder wheel of the present invention.
Figure 4:
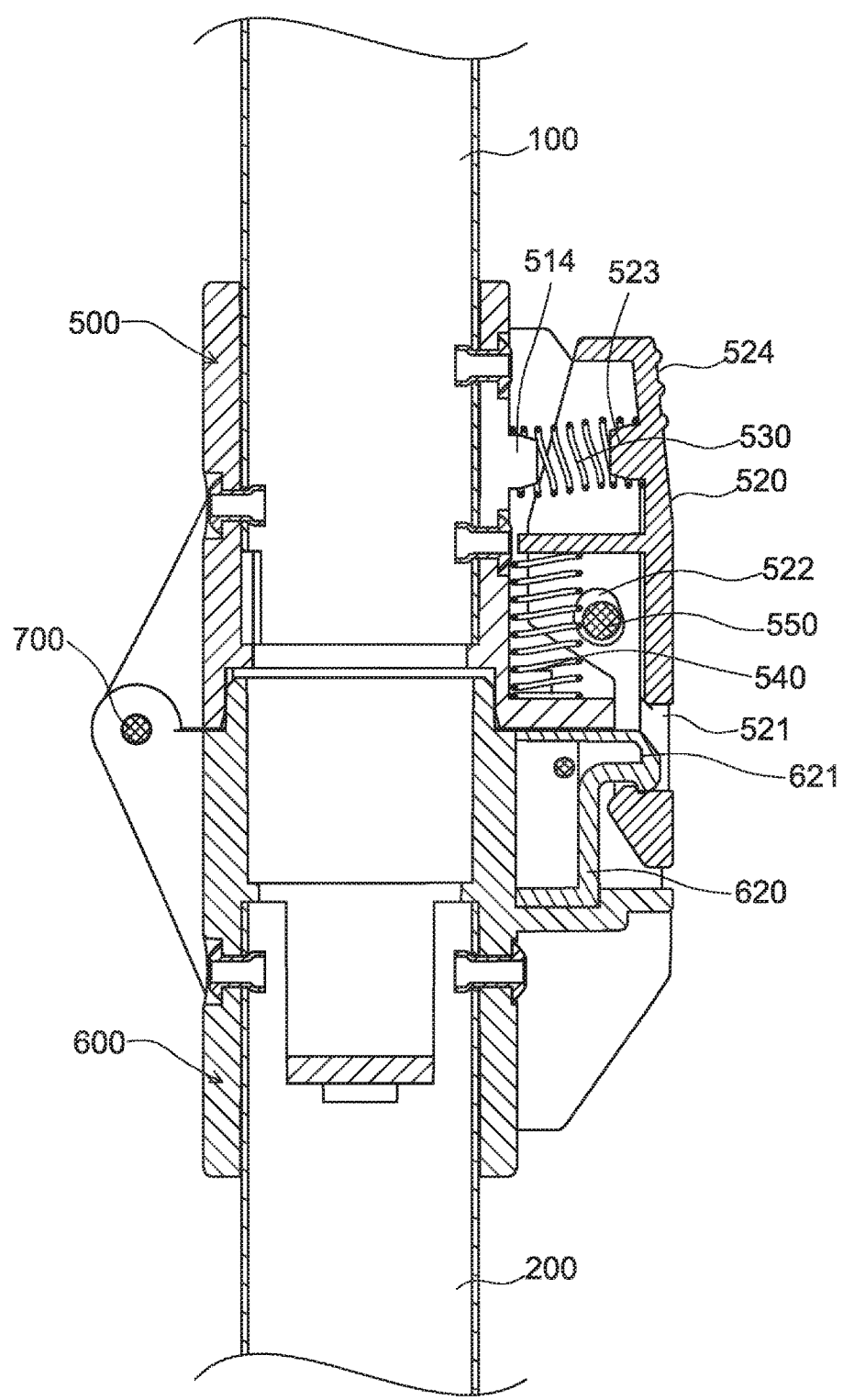
FIG. 4 is a cross sectional view to show the fastening structure of the rangefinder wheel of the present invention.
Figure 5:
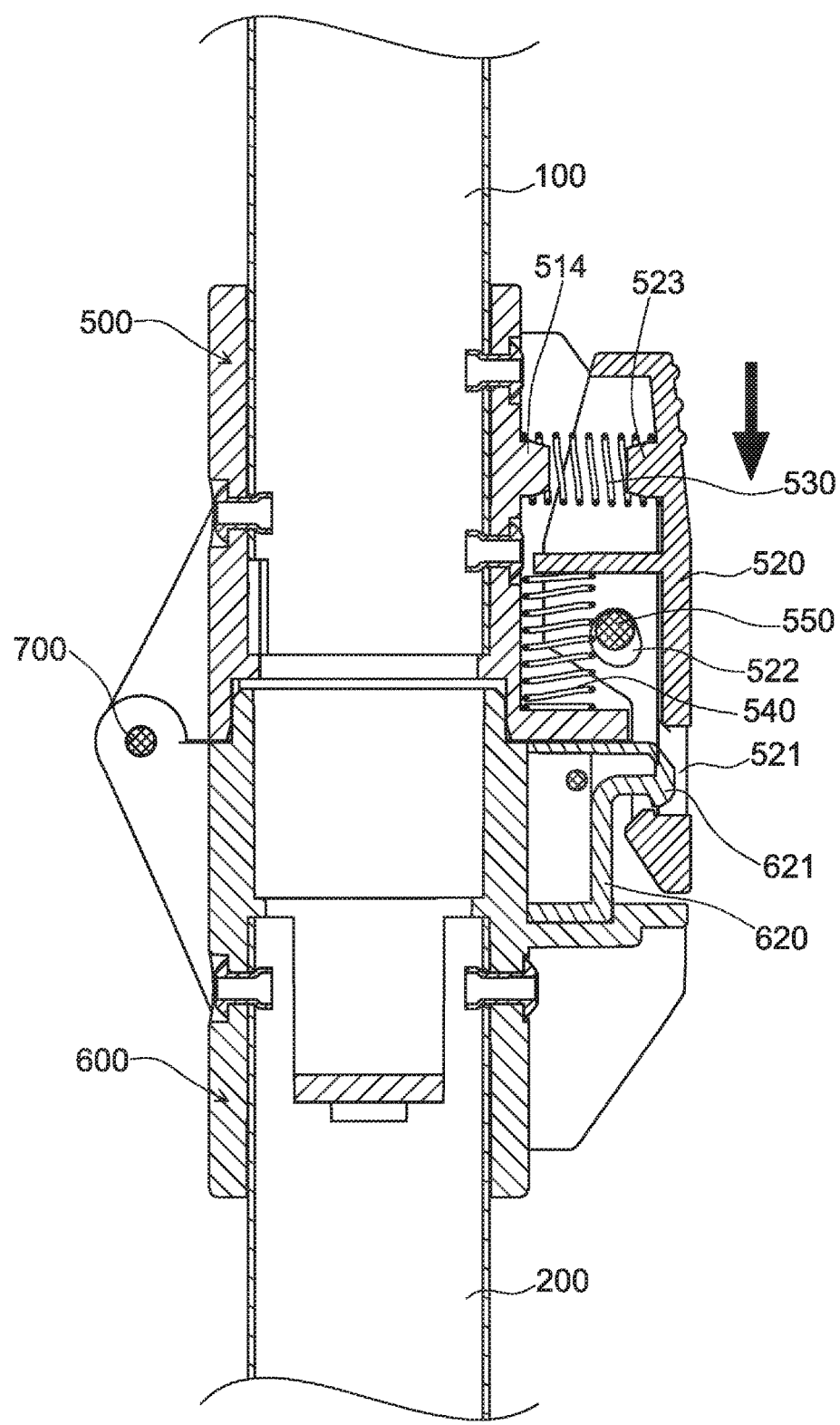
FIG. 5 shows that the lever the fastening structure of the present invention is pushed downward.
Figure 6:
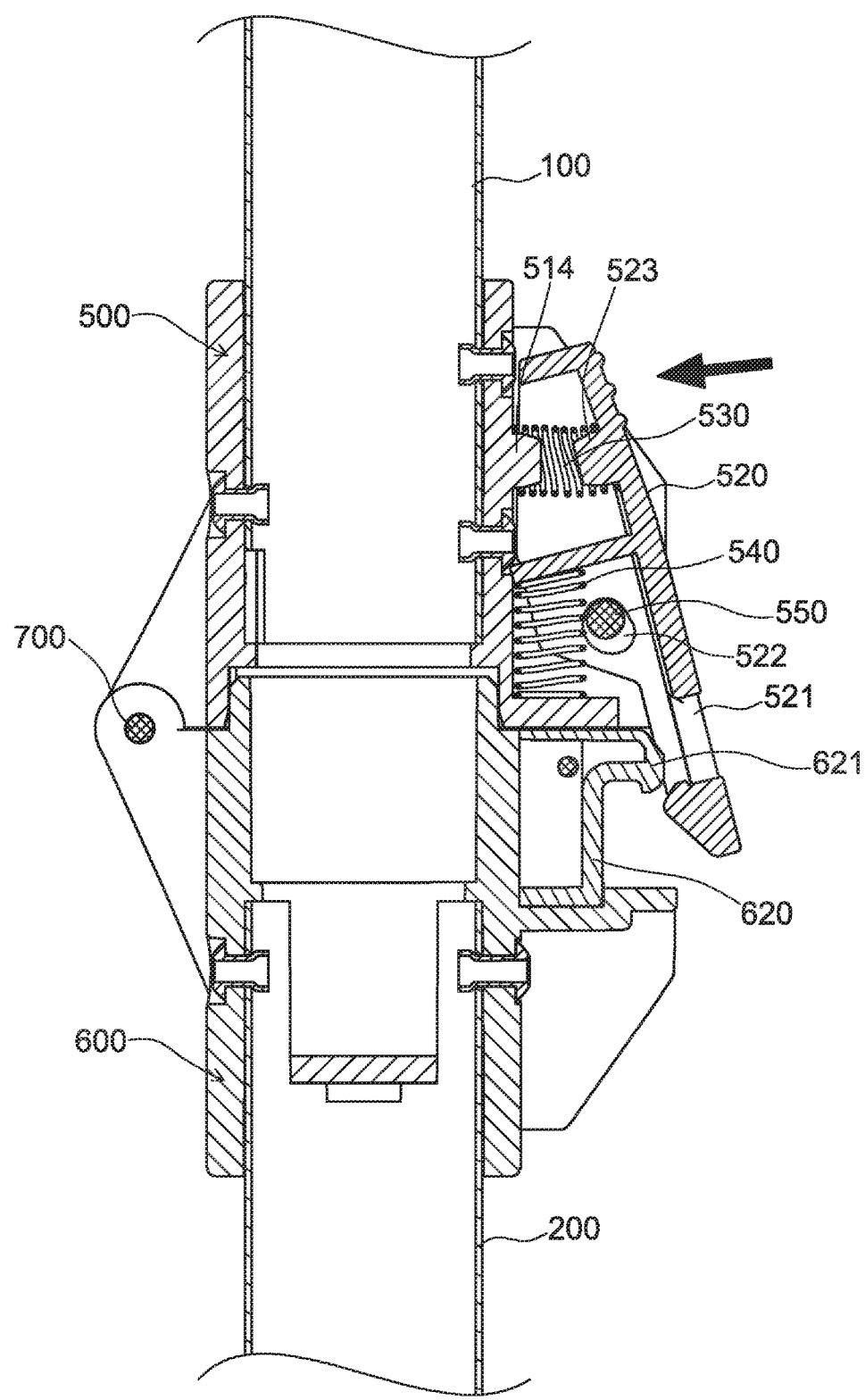
FIG. 6 shows that the lever the fastening structure of the present invention is pivoted.
Figure 7:
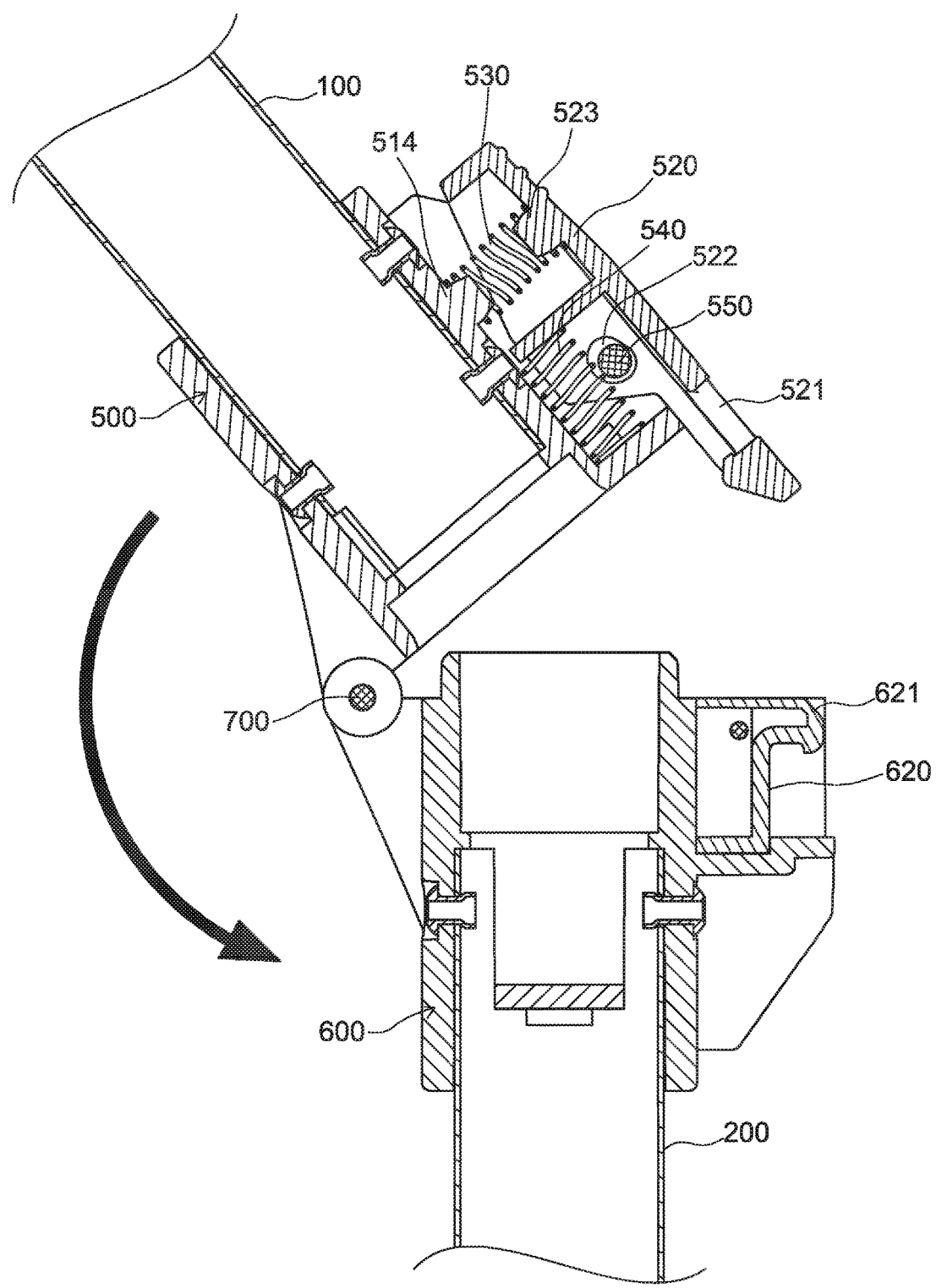
FIG. 7 shows that the lever the fastening structure of the present invention is separated from the engaging member.
Figure 8:
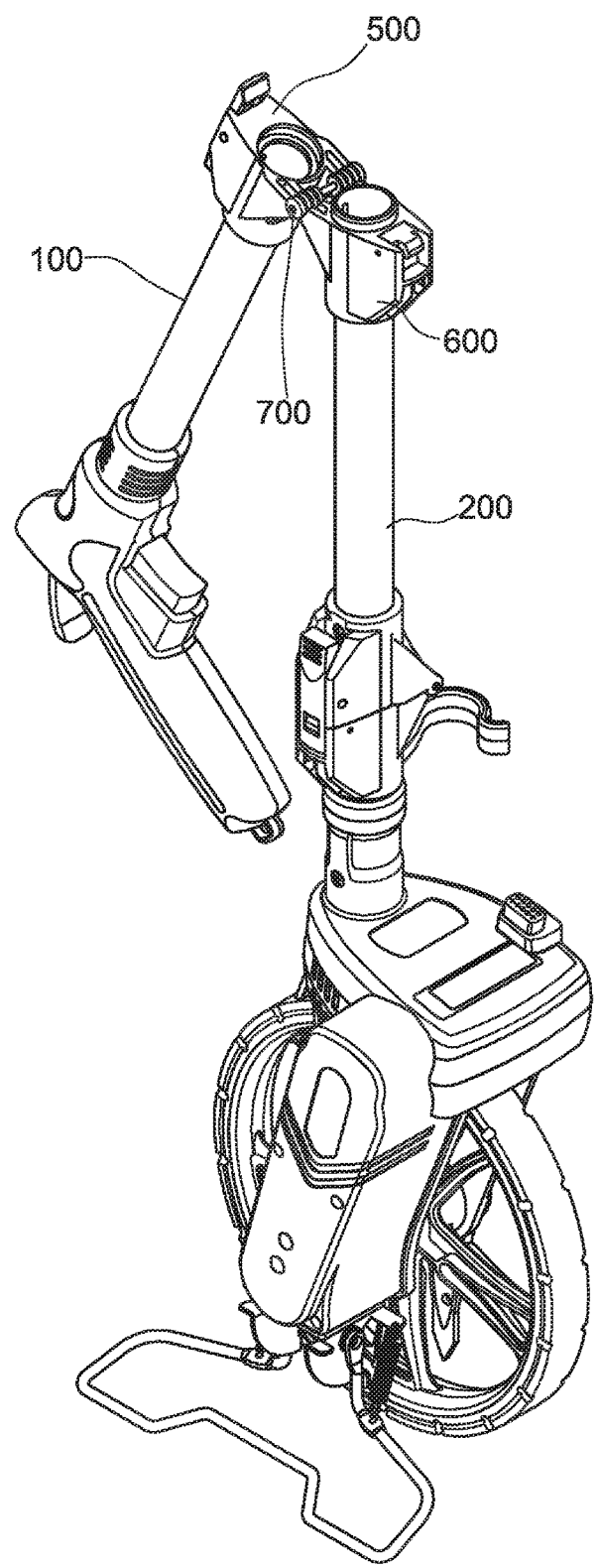
FIG. 8 shows that the first tube is pivoted relative the second tube of the rangefinder wheel of the present invention.

Referring to FIGS. 1 to 4, the fastening structure 400 of a rangefinder wheel of the present invention comprises a first unit 500 and a second unit 600. The rangefinder wheel comprises a first tube 100, a second tube 100, a second tube 200, a third tube 300, and a wheel. The first, second and third tubes 100, 200, 300 are connected to each other by two sets of the fastening structure 400. The wheel is connected to the lower end of the third tube 300.

The first unit 500 includes a first base 510. The first base 510 has a first passage 11 defined axially therethrough in which the first tube 100 is received. A lever 520 is pivotably connected to the first base 510. The first base 510 has two circular holes 512, and the lever 520 has an oval hole 522. A first pin 550 extends through the two circular holes 512 and the oval hole 522 to pivotably connect the lever 520 to the first base 510. The lever 520 has an engaging hole 521. A first spring 530 and a second spring 540 are biased between the first base 510 and the lever 520 in two different directions.

The second unit 600 is pivotably connected to the first base 510 and has a second base 610 which has a second passage 611 defined axially therethrough in which the second tube 100 is received therein. The first base 510 has multiple first pivotal holes 513, and the second base 610 has multiple second pivotal holes 612. A second pin 700 extends through the first and second pivotal holes 513, 612. An engaging member 620 is connected to the second base 610 and has a protrusion 621 which is engaged with the engaging hole 521 of the lever 520 when the lever 520 connects the first an second bases 510, 610.

The engaging member 620 includes protrusion 621 and a curved recess 622 is defined in the underside of the protrusion 621. The lever 520 includes a hooked end which is removably engaged with the curved recess 622 when the protrusion 621 of the engaging member 620 extends through the engaging hole 521.

It is noted that the first base 510 has a first positioning point 514, and the lever 520 has a second positioning point 523, so that the first spring 530 is connected between the first and second positioning points 514, 523. The lever 520 has a plate extends from the inside thereof, and the first base 510 has a lip extends laterally therefrom, so that the second spring 540 is biased between the plate of the lever 520 and the lip of the first base 510. The lever 520 has a serrated surface 524 formed on the outside thereof so as to provide friction when the user operates the lever 520.

The first tube 100 and the second tube 200 are connected to each other by the first unit 500, the second unit 600 and the second pin 700. When folding the first tube 10 relative to the second tube 200, the user operates the lever 520 to compress the second spring 540 downward to move a distance in the axial distance, and the lever 520 compresses the first spring 530 inward to move a distance in the transverse direction. Therefore, the protrusion 621 is removed from the engaging hole 521, and the lever 520 is separated from the engaging member 620.

When the user wants to re-assemble the first tube 100 to be aligned with the second tube 200, the first and second springs 530, 540 provide recovery forces to allow the protrusion 621 to be engaged with the engaging hole 521 again.

It is noted that oval hole 522 of the lever 520 provides a distance that the lever 520 is moved to compress the first and second springs 530, 540.

While we have shown and described the embodiment in accordance with the present invention, it should be clear to those skilled in the art that further embodiments may be made without departing from the scope of the present invention.

What is claimed is:

1. A fastening structure of a rangefinder wheel, comprising:
    a first unit which includes a first base, the first base having a first passage defined axially therethrough which is adapted to receive a first tube therein, a lever pivotably connected to the first base and having an engaging hole, a first spring and a second spring biased between the first base and the lever, and
    a second unit pivotably connected to the first base and having a second base which has a second passage defined axially therethrough which is adapted to receive a second tube therein, an engaging member connected to the second base and having a protrusion which is engaged with the engaging hole of the lever;
    wherein the first unit has a first pin, the first base has two circular holes, the lever has an oval hole, the first pin extends through the two circular holes and the oval hole; the first base has multiple first pivotal holes, the second base has multiple second pivotal holes, a second pin extends through the first and second pivotal holes;
    wherein the first tube and the second tube are connectable to each other by the first unit, the second unit and the second pin;
    wherein when the lever is depressed and pivoted with respect to the first tube, the second spring compresses downward and moves a distance in an axial direction and the first spring compresses inward and moves a distance in a transverse direction, so that the protrusion can be removed from the engaging hole and the lever is separated from the engaging member; and
    wherein the first and second springs provide recovery forces to allow the protrusion to be re-engaged with the engaging hole.

2. The fastening structure as claimed in claim 1, wherein the engaging member includes a curved recess defined in an underside thereof, the lever includes a hooked end which is removably engaged with the curved recess.

3. The fastening structure as claimed in claim 1, wherein the first base has a first positioning point, the lever has a second positioning point, the first spring is connected between the first and second positioning points.

4. The fastening structure as claimed in claim 1, wherein the lever has a serrated surface for providing friction.

* * * * *